United States Patent
Tomita et al.

(10) Patent No.: US 7,037,477 B2
(45) Date of Patent: May 2, 2006

(54) SILICON CARBIDE-BASED POROUS MATERIAL AND PROCESS FOR PRODUCTION THEREOF

(75) Inventors: Takahiro Tomita, Chita (JP); Yuichiro Tabuchi, Nagoya (JP); Shuichi Ichikawa, Handa (JP); Takashi Harada, Nagoya (JP)

(73) Assignee: NGK Insulators, Nagoya (JP)

( * ) Notice: Subject to any disclaimer, the term of this patent is extended or adjusted under 35 U.S.C. 154(b) by 277 days.

(21) Appl. No.: 10/296,148

(22) PCT Filed: Mar. 27, 2002

(86) PCT No.: PCT/JP02/02970

§ 371 (c)(1),
(2), (4) Date: Nov. 21, 2002

(87) PCT Pub. No.: WO02/081406

PCT Pub. Date: Oct. 17, 2002

(65) Prior Publication Data

US 2004/0033893 A1 Feb. 19, 2004

(51) Int. Cl.
*C01B 31/36* (2006.01)

(52) U.S. Cl. ....................................... 423/345
(58) Field of Classification Search .............. 423/345, 423/421, 430, 439, 441, 442
See application file for complete search history.

(56) References Cited

U.S. PATENT DOCUMENTS

| | | | |
|---|---|---|---|
| 4,777,152 A * | 10/1988 | Tsukada | 501/80 |
| 5,080,378 A * | 1/1992 | Kagawa | 277/404 |
| 6,217,841 B1 * | 4/2001 | Grindatto et al. | 423/345 |
| 6,746,748 B1 * | 6/2004 | Ichikawa et al. | 428/116 |
| 6,777,114 B1 * | 8/2004 | Kawasaki et al. | 428/698 |

FOREIGN PATENT DOCUMENTS

| | | |
|---|---|---|
| JP | A 52-154816 | 12/1977 |
| JP | 60-255671 | 12/1985 |
| JP | 61-26550 | 2/1986 |
| JP | 61-13845 | 4/1986 |
| JP | 61-13846 | 4/1986 |
| JP | 1-172290 | 7/1989 |
| JP | 1-192764 | 8/1989 |
| JP | 3-126670 | 5/1991 |
| JP | 05-17227 * | 1/1993 |
| JP | A 5-17227 | 1/1993 |
| JP | 6-182228 | 7/1994 |
| JP | 8-165171 | 6/1996 |
| JP | 9-85038 | 3/1997 |
| JP | 10-310474 | 11/1998 |

OTHER PUBLICATIONS

Translation of JP 05–17227.*
U.S. Appl. No. 10/257,008, filed Oct. 7, 2002.

* cited by examiner

*Primary Examiner*—Colleen P. Cooke
(74) *Attorney, Agent, or Firm*—Oliff & Berridge, PLC

(57) ABSTRACT

A silicon carbide-based porous material containing silicon carbide particles (1) as an aggregate and metallic silicon (2), wherein the average particle diameter of the silicon carbide-based porous material is at least 0.25 time the average particle diameter of the silicon carbide particles (1), or the contact angle between the silicon carbide particles (1) and the metallic silicon (2) is acute, or a large number of secondary texture particles each formed by contact of at least four silicon carbide particles (1) with one metallic silicon (2) are bonded to each other to form a porous structure. This silicon carbide-based porous material can be sintered, in its production, at a relatively low firing temperature and, therefore, can be provided at a low production cost, at a high yield and at a low product cost.

14 Claims, 5 Drawing Sheets

SILICON CARBIDE-BASED POROUS MATERIAL AND PROCESS FOR PRODUCTION THEREOF

TECHNICAL FIELD

The present invention relates to a silicon carbide-based porous material used in a filter for purification of automobile exhaust gas, a catalyst carrier, etc., as well as to a process for production thereof.

BACKGROUND ART

A porous honeycomb structure is widely used as a filter for capturing and removing the particulate substance contained in a particle-containing fluid such as diesel engine exhaust gas, or as a catalyst carrier for loading thereon a catalyst component which purifies the harmful substance present in an exhaust gas. Also, it is known to use refractory particles such as silicon carbide (SiC) particles, as a material constituting such a honeycomb structure.

As a specific technique related thereto, there is disclosed, in, for example, JP-A-6-182228, a porous silicon carbide-based catalyst carrier of honeycomb structure obtained by using, as a starting material, a silicon carbide powder having a given specific surface area and containing impurities, molding the powder into a desired shape, drying the molded material and firing it in a temperature range of 1,600 to 2,200° C.

There is also disclosed, in JP-A-10-310474, a SiC—Si composite ceramic material containing a given amount of Ca or a Ca compound and showing durability in a high-temperature alkali gas atmosphere.

In the sintering (necking) mechanism owing to a recrystallization reaction of silicon carbide powder per se, shown in the above-mentioned JP-A-6-182228, a silicon carbide component vaporizes from the surfaces of silicon carbide particles and condenses at the contact areas (necks) between the particles; as a result, the necks grow and a bonding structure is obtained. However, the vaporization of silicon carbide requires a very high firing temperature, which incurs a high cost, requires high-temperature firing of a material high in thermal expansion coefficient, and has invited a problem of reduced yield in firing process.

Also in production of the SiC—Si composite ceramic material shown in JP-A-10-310474, firing at a high temperature of 1,800 to 2,000° is necessary. Further, this SiC—Si composite ceramic material is a dense material used mainly as a firing container such as crucible or the like, making it impossible to use the ceramic material as a material for porous filter.

In order to solve the above-mentioned problems, the present inventors disclosed, in Japanese Patent Application No. 2001-32699, a porous honeycomb structure containing, as an aggregate, refractory particles, particularly silicon carbide and metallic silicon, and a process for production thereof. In the patent application was disclosed a honeycomb structure which can be produced inexpensively at a relatively low firing temperature, which has a high thermal conductivity, and which is sufficiently porous and has a high specific surface area.

Even with the production process shown in Japanese Patent Application No. 2001-32699, however, a problem may arise. FIG. 4 is a schematic drawing explaining a contact state between silicon carbide particles and metallic silicon, in the fine structure of a conventional silicon carbide-based porous material, and indicates a state in which metallic silicon 2 is in contact with silicon carbide particles 1 and the surfaces of the two materials are each covered with? by an oxide film 3. Incidentally, the oxide film 3 referred to herein is $SiO_2$ or the like. When firing is conducted according to the above process, the wettability between molten metallic silicon 2 and silicon carbide particles 1 may not be good and, in the resulting silicon carbide-based porous material, the contact angle $\theta$ between the oxide film 3 on silicon carbide particles 1 and the oxide film 3 on metallic silicon 2 is obtuse. That is, the silicon carbide-based porous material has such a structure as metallic silicon 2 is repelled by silicon carbide particles 1, and the contact area between the two materials may be small.

Thus, when the above-mentioned contact area is small, there may be expected to rise such problems that the strength of the silicon carbide-based porous material per se is reduced, and that the thermal conductivity of the product becomes lower since its path for thermal conduction is narrow.

Meanwhile, the pore diameter of the produced silicon carbide-based porous material depends upon the particle diameter of the silicon carbide particles used as an aggregate. That is, in order to obtain a silicon carbide-based porous material of large pore diameter, silicon carbide particles of larger particle diameter are used generally. Use of silicon carbide particles of large particle diameter may make molding difficult. Further, abrasion of molding die is striking in extrusion into a honeycomb shape or the like, which may invite problems of increased production cost, etc. That is, selection of particle diameter of silicon carbide particles in order to control the porosity of silicon carbide-based porous material and make large the pore diameter thereof has a restriction in technique and production cost.

The present invention has been completed in view of the above-mentioned problems of prior art, and aims at providing a silicon carbide-based porous material which can be produced at a low cost and which is high in porosity and thermal conductivity and is increased in strength, and a process for production thereof.

DISCLOSURE OF THE INVENTION

According to the present invention there is provided a silicon carbide-based porous material containing silicon carbide particles as an aggregate and metallic silicon, characterized in that the average pore diameter of the silicon carbide-based porous material is at least 0.25 time the average particle diameter of the silicon carbide particles.

Meanwhile, according to the present invention there is provided a silicon carbide-based porous material containing silicon carbide particles as an aggregate and metallic silicon, characterized in that the contact angle between the silicon carbide particles and the metallic silicon is an acute.

According to the present invention there is also provided a silicon carbide-based porous material containing silicon carbide particles as an aggregate and metallic silicon, characterized in that a large number of secondary texture particles each formed by contact of at least four silicon carbide particles with one metallic silicon are bonded to each other to form a porous structure. In the present invention, the number of the silicon carbide particles contained in one secondary texture particle is 30% or more of the number of the silicon carbide particles contained in the silicon carbide-based porous material.

According to the present invention there is further provided a silicon carbide-based porous material containing silicon carbide particles as an aggregate and metallic silicon, characterized in that the area of the interface between the silicon carbide particles and the metallic silicon is 50% or more of the total area of the interface area and the surface area of the metallic silicon.

In the present invention, it is preferred that an amorphous or crystalline silicate compound phase is on or in the vicinity of the silicon carbide particles and/or the metallic silicon and also that the silicon carbide particles are bonded to each other by the metallic silicon and/or the silicate compound phase. It is also preferred that the silicate compound phase contains at least one kind of metal element other than silicon and silicon dioxide and the eutectic point between the at least one kind of metal element and the silicon dioxide is 1,200 to 1,600° C. It is further preferred that the content of the at least one kind of metal element to the total of the silicon carbide particles and the metallic silicon is 0.1 to 10% by mass.

In the present invention, it is further preferred that at least one kind of the at least one kind of metal element is an alkaline earth metal element and that the at least one kind of metal element further contains a metal element other than the alkaline earth metal element. It is also preferred that the alkaline earth metal element is calcium and/or strontium. Incidentally, in the present invention, the content of the metallic silicon to the total of the silicon carbide particles and the metallic silicon is 5 to 50% by mass.

According to the present invention, there is also provided a honeycomb structure characterized by being constituted by any of the above-mentioned silicon carbide-based porous materials.

Meanwhile, according to the present invention there is provided a process for producing a silicon carbide-based porous material, characterized by adding metallic silicon and an organic binder to a silicon carbide particles material, mixing and kneading them, molding the resulting puddle into a predetermined shape, calcinating the resulting molded material to remove the organic binder contained in the molded material, and then firing the calcinated material in a reduced pressure atmosphere.

According to the present invention there is also provided a process for producing a silicon carbide-based porous material, characterized by adding metallic silicon and an organic binder to a silicon carbide particles material, mixing and kneading them, molding the resulting puddle into a predetermined shape, calcinating the resulting molded material to remove the organic binder contained in the molded material, and then firing the calcinated material in a hydrogen-containing reducing atmosphere.

According to the present invention there is provided a process for producing a silicon carbide-based porous material, characterized by adding a metal element or a compound containing the metal element, metallic silicon and an organic binder to a silicon carbide particles material, mixing and kneading them, molding the resulting puddle into a predetermined shape, calcinating the resulting molded material to remove the organic binder contained in the molded material, and then firing the calcinated material in a non-oxidizing atmosphere.

In the present invention, it is preferred to use, as the metal element, a metal element showing an eutectic point of 1,200 to 1,600° C. toward silicon dioxide and also use, as the metal element, an alkaline earth metal element. It is further preferred to use, as the alkaline earth metal element, calcium and/or strontium and also use, as the compound containing the metal element, at least one kind selected from the group consisting of fluorides, carbides, chlorides, silicides, carbonates, hydroxides, oxides, inorganic acid salts and organic acid salts. Incidentally, it is preferred to use a silicate as the inorganic acid salt.

In the present invention, it is preferred that the puddle is molded into a honeycomb shape and that the firing is conducted in a temperature range of 1,300 to 1,600° C.

BEST MODE FOR CARRYING OUT THE INVENTION

Embodiments of the present invention are described below. However, the present invention is not restricted to the following embodiments and it is to be understood that design change, modification, etc. can be added appropriately based on the ordinary knowledge of those skilled in the art unless the scope of the present invention is departed.

The silicon carbide-based porous material of the present invention contains silicon carbide particles as an aggregate and metallic silicon; therefore, in its production, sintering is possible at a relatively low firing temperature, and the production cost can be suppressed, and the yield can be increased. Further, the silicon carbide-based porous material utilizes metallic silicon in order to bond silicon carbide particles which are refractory particles and, therefore, has a high thermal conductivity; as a result, even when it is used, for example, as a DPF (diesel particulate filter) and the particulates deposited thereon are burnt for filter regeneration, there is no such localized elevation of temperature as to damage the filter.

Also in the silicon carbide-based porous material of the present invention, it is necessary that its average pore diameter (hereinafter referred to simply as "pore diameter") is at least 0.25 time, preferably at least 0.40 time, more preferably at least 0.50 time the average particle diameter (hereinafter referred to simply as "particle diameter") of the silicon carbide particles (which are one constituent element of the silicon carbide-based porous material). By specifying the pore diameter at the above level, there can be obtained a silicon carbide-based porous material having properties such as higher porosity, higher thermal conductivity and the like.

Incidentally, when the pore diameter is below 0.25 time the particle diameter of the silicon carbide particles used, the particle diameter of the silicon carbide particles used need be large when a somewhat large pore diameter is aimed, which may make moldability inferior. For example, the abrasion of the die used in extrusion into honeycomb shape or the like may become evident; therefore, the pore diameter of below 0.25 time is not preferred.

Herein, in the present invention, there is no particular restriction as to the upper limit of the above value. When the pore diameter is within a given level, the particle diameter of silicon carbide particles is preferably as small as possible. However, the pore diameter may be below about 5.0 times when actual production conditions, etc. are taken into consideration. Incidentally, description is made later on the process for producing a silicon carbide-based porous material having the above-mentioned structural features, according to the present invention.

Figure 1:
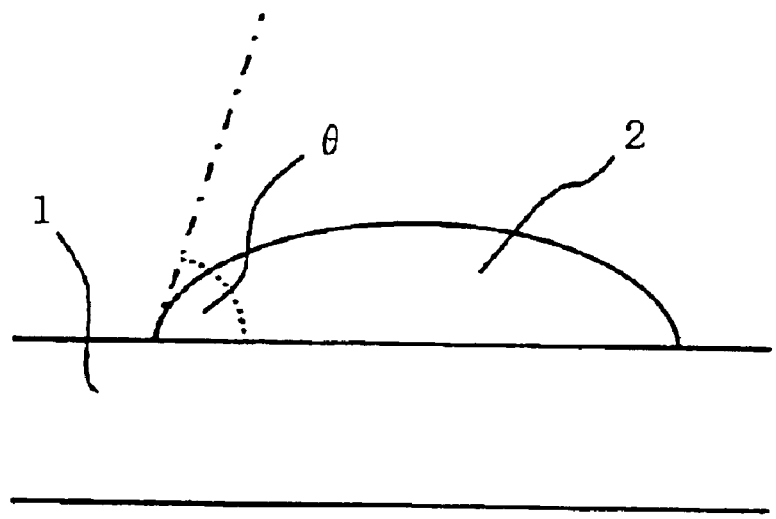
FIG. 1 is a schematic drawing explaining an example of the contact state between silicon carbide particles and metallic silicon in the fine structure of the silicon carbide-based porous material of the present invention.

The silicon carbide-based porous material of the present invention is characterized in that the contact angle between the silicon carbide particles and the metallic silicon is acute. FIG. 1 is a schematic drawing explaining an example of the contact state between silicon carbide particles and metallic silicon in the fine structure of the silicon carbide-based porous material of the present invention, and indicates a state in which metallic silicon 2 contacts with silicon carbide particles 1. That is, in the silicon carbide-based porous material of the present invention, the contact angle θ between silicon carbide particles 1 and metallic silicon 2 is acute and the wettability between molten metallic silicon 2 and silicon carbide particles 1 is improved. Therefore, the contact area between the two materials is large and accordingly the silicon carbide-based porous material of the present invention has characteristics such as higher strength, higher thermal conductivity and the like. Incidentally, description is made later on the process for producing a silicon carbide-based porous material having such structural features, according to the present invention.

Figure 4:
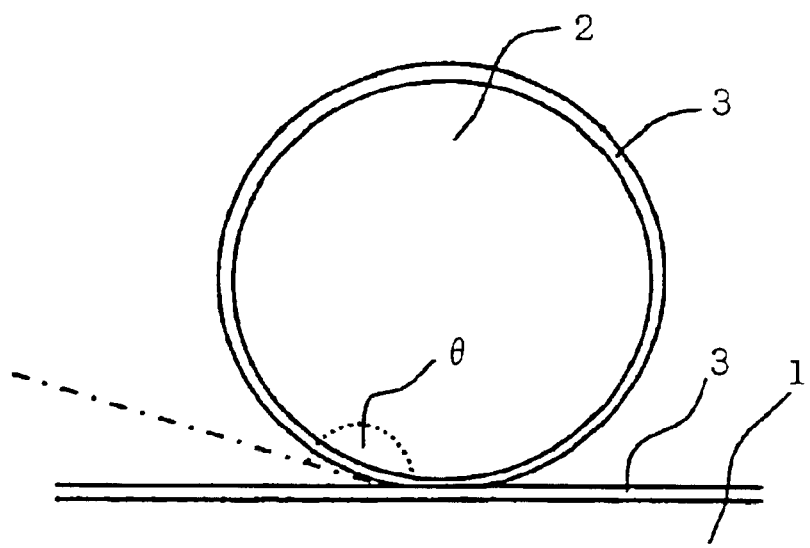
FIG. 4 is a schematic drawing explaining an example of the contact state between silicon carbide particles and metallic silicon in the fine structure of a conventional silicon carbide-based porous material.

Herein, "contact angle" is a term generally used for indicating an angle formed by contact between a solid and a liquid. In the present invention, however, it is used when two different solids contact with each other. That is, of the angles formed between a tangent drawn to metallic silicon at the contact point between silicon carbide particle and metallic silicon and the surface of silicon carbide particles, an angle θ including metallic silicon is called "contact angle". Incidentally, in the case of the fine structure of a conventional silicon carbide-based porous material such as shown in FIG. 4, an angle θ including metallic silicon, of the angles formed between a tangent drawn to metallic silicon at the contact point between an oxide film 3 on silicon carbide particles 1 and an oxide film 3 on metallic silicon 2 and the surface of the oxide film 3 on silicon carbide particles 1, is called "contact angle".

The silicon carbide-based porous material of the present invention is characterized in that a large number of secondary texture particles (each secondary texture particle is hereinafter referred to as "domain") each of which is formed by contact of at least four silicon carbide particles with one metallic silicon are bonded to each other to form a porous structure. That is, domains are bonded to each other to form a porous structure; as a result, the bonded portions are thick and the silicon carbide-based porous material has properties such as high strength, high thermal conductivity and the like.

Also when used, for example, as a DPF, the silicon carbide-based porous material hardly gives rise to localized elevation of temperature and is superior also in thermal shock resistance. Further, since pores are formed by the gaps between domains, the pores have large diameters as compared with the case in which the contact angle between silicon carbide particles and metallic silicon is obtuse, and the pressure loss in use as a filter can be made small.

Further in the present invention, the pore diameter depends upon the size of domain. That is, it is unnecessary to control the pore diameter by the particle diameter of the silicon carbide particles used, and the pore diameter can be made large even when silicon carbide particles of relatively small particle diameter are used. Therefore, even when extrusion is made into a honeycomb shape or the like, moldability is good and problems such as die abrasion and the like are prevented; resultantly, an increase in production yield and a reduction in equipment cost are possible. Incidentally, description is made later on the process for producing a silicon carbide-based porous material having the above-mentioned structural features, according to the present invention.

Further in the present invention, the number of the silicon carbide particles contained in one secondary texture particle is preferably 30% or more of the number of silicon carbide particles contained in the silicon carbide-based porous material. When the number is below 30%, the contact area between silicon carbide particles and metallic silicon is not sufficiently large and no striking improvements are obtained in strength, thermal conductivity, etc.; therefore, such a number is not preferred.

The number is more preferably 35% or more, particularly preferably 40% or more. In the present invention, there is no particular restriction as to the upper limit of the number, and it is preferred that all the silicon carbide particles are contained in the secondary texture particles. However, the number may be approximately below 90% when actual production conditions, etc. are taken into consideration.

Meanwhile, in the present invention, it is necessary that the area of the interface between silicon carbide particles and metallic silicon is 50% or more, preferably 65% or more, more preferably 80% or more of the total of the interface area and the surface area of metallic silicon. By specifying the interface area at the above level, it is possible to produce a silicon carbide-based porous material having properties such as higher porosity, higher thermal conductivity and the like. When the interface area is below 50%, the contact area between silicon carbide particles and metallic silicon is not sufficiently large and no striking improvements are seen in strength, thermal conductivity, etc.; therefore, such an interface area is not preferred.

In the present invention, there is no particular restriction as to the upper limit of the interface area, and the area of the interface between silicon carbide particles and metallic silicon is preferably 95% or more of the total of the interface area and the surface area of metallic silicon. However, the interface area may be approximately below 90% when actual production conditions, etc. are taken into consideration. Incidentally, description is made later on the process for producing a silicon carbide-based porous material having the above-mentioned structural features, according to the present invention.

Incidentally, the proportion of the area of interface between silicon carbide particles and metallic silicon, to the total of the above interface area and the surface area of metallic silicon, referred to in the present invention (the proportion is hereinafter referred to simply as "proportion of interface area"), is calculated according to the following method. First, a silicon carbide-based porous material as an object is embedded into a resin and polished to obtain its internal section. The section is observed using a scanning type electron microscope and the micrograph taken is subjected to image analysis. Using the analytical photograph, measurements are made for the length of the curve of interface between silicon carbide particles and metallic silicon and the length of the curve of metallic silicon surface, and the proportion of the length of the interface curve to the total of the length of the interface curve and the length of the curve of metallic silicon surface is taken as the proportion of interface area.

Figure 2:
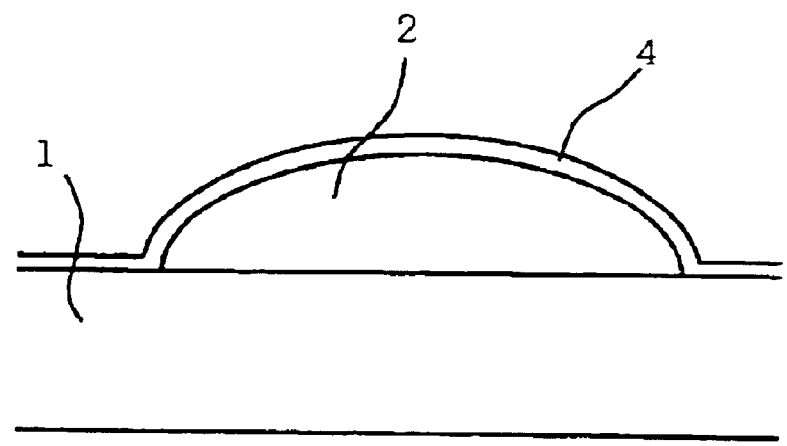
FIG. 2 is a schematic drawing explaining other example of the contact state between silicon carbide particles and metallic silicon in the fine structure of the silicon carbide-based porous material of the present invention.

In the present invention, it is preferred that the silicon carbide-based porous material contains an amorphous or crystalline silicate compound phase on or in the vicinity of the silicon carbide particles and/or the metallic silicon. FIG. 2 is a schematic drawing explaining other example of the contact state between silicon carbide particles and metallic silicon in the fine structure of the silicon carbide-based porous material of the present invention, and indicates a state in which the surfaces of silicon carbide particle 1 and metallic silicon 2 are each covered with a silicate compound phase 4. Owing to the action of the metal element added, each of the oxide film on silicon carbide and the oxide film on metallic silicon forms a silicate compound phase 4 which does not adversely affect on the wettability between silicon carbide and metallic silicon. As a result, the silicate compound phase 4 functions so as to improve the wettability between silicon carbide particles 1 and metallic silicon 2 and the contact area between the two materials is enlarged. Incidentally, as the content of the silicate compound phase 4 increases, the thermal conductivity of the silicon carbide-based porous material decreases. That is, the silicon carbide-based porous material of the present invention shows a required thermal conductivity depending upon the content of the silicate compound phase and the content can be controlled as necessary. Thus, the silicon carbide-based porous material of the present invention is high in porosity and strength and the thermal properties thereof including thermal conductivity can be controlled as desired.

Figure 9A:
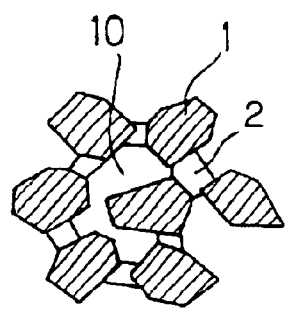
FIGS. 9($a$) to ($c$) are each a schematic drawing showing the fine structure of the silicon carbide-based porous material of the present invention.
Figure 9B:
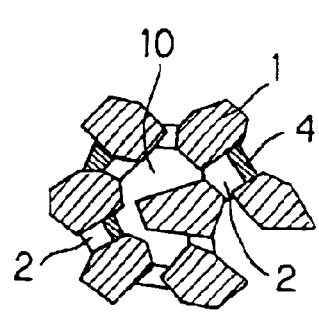
Figure 9C:
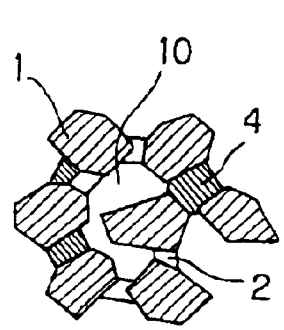

In the present invention, it is preferred that the silicon carbide particles are bonded to each other by the metallic silicon and/or the silicate compound phase. FIGS. 9(a) to (c) are each a schematic drawing explaining the fine structure of the silicon carbide-based porous material of the present invention and indicates a state in which silicon carbide particles 1 are bonded to each other by metallic silicon 2 and/or a silicate compound phase 4 to form pores 10. That is, the silicon carbide-based porous material of the present invention may be in any of a state [FIG. 9(a)] in which silicon carbide particles 1 are bonded to each other by metallic silicon 2, a state [FIG. 9(b)] in which silicon carbide particles 1 are bonded to each other by metallic silicon 2 or by metallic silicon 2 and a silicate compound phase 4, and a state [FIG. 9(c)] in which silicon carbide particles 1 are bonded to each other by metallic silicon 2, or by metallic silicon 2 and a silicate compound phase 4, or by a silicate compound phase 4. By having such a fine structure, the silicon carbide-based porous material of the present invention is high in porosity and strength and the thermal properties thereof including thermal conductivity can be adjusted arbitrarily. Incidentally, the fine structures shown in FIGS. 9(a) to (c) are illustrative only and the present invention is not restricted to these illustrations alone, and the present silicon carbide-based porous material may partially include, for example, those silicon carbide particles which are not bonded to each other and to which metallic silicon and/or a silicate compound phase is adhered.

Further in the present invention, the silicate compound phase contains at least one kind of metal element other than silicon and silicon dioxide, and the eutectic point between the at least one kind of metal elements and silicon dioxide is preferably 1,200 to 1,600° C. in order to achieve wettability improvement more effectively. When the eutectic point is below 1,200° C., the melt of MO— ($M_1O$—, $M_2O$—, . . . )$SiO_2$ system (M, $M_1$, $M_2$, . . . refer to at least one kind of metal elements) does not remain at about the firing temperature at which metallic silicon melts, and the above-mentioned wettability improvement and contact area enlargement are hardly obtained during firing; therefore, such an eutectic point is not preferred. Meanwhile, when the eutectic point is more than 1,600° C., the reaction between MO ($M_1O$, $M_2O$, . . . ) and $SiO_2$ does not proceed sufficiently and the above-mentioned wettability improvement and contact area enlargement are hardly obtained during firing; therefore, such an eutectic point is not preferred.

Also in the present invention, the content of the at least one kind of metal elements to the total of silicon carbide particles and metallic silicon is preferably 0.1 to 10% by mass, more preferably 0.2 to 7% by mass, particularly preferably 0.3 to 5% by mass. By specifying the content of the at least one kind of metal elements in the above range, the wettability between silicon carbide particles and metallic silicon is improved. Incidentally, when the content is below 0.1% by mass, the effect of the metal element is not exhibited; when the content is more than 10% by mass, the amount of the silicate compound phase formed is too large and a significant increase in thermal expansion coefficient may arise; therefore, such contents are not preferred.

In the present invention, at least one kind among the at least one kind of metal elements is preferably an alkaline earth metal element, and the at least one kind of metal elements preferably contains further a metal element other than alkaline earth metal element. Thereby, the wettability between silicon carbide particle and metallic silicon is improved effectively and a silicon carbide-based porous material having properties such as high porosity and the like can be obtained.

Incidentally, a metal element other than alkaline earth metal element can be any metal which forms, with an alkaline earth metal, at least three-component system having an eutectic point of 1,200 to 1,600° C. As specific examples thereof, there can be mentioned Al, Ti and Fe. As specific examples of the at least three-component system, there can be mentioned a Mg—Al—Si system, a Sr—Al—Si system, a Ba—Al—Si system, a Ca—Al—Si system and a Ca—Mg—Si system. The alkaline earth metal element is preferably calcium and/or strontium from the standpoints of low cost, good availability, wettability improvement, etc.

Further in the present invention, the content of the metallic silicon to the total of the silicon carbide particles and the metallic silicon is preferably 5 to 50% by mass. By specifying the content of the metallic silicon in the above range, firing at low temperatures is possible as compared with when a conventional silicon carbide-based porous material containing no metallic silicon is fired, and properties such as high porosity, high thermal conductivity and the like are attained. When the content is below 5% by mass, the properties of metallic silicon as binder are not exhibited sufficiently, the bonding between adjacent silicon carbide particles by metallic silicon is insufficient, the resulting thermal conductivity is low, and, when, for example, a thin-wall structure such as honeycomb structure is produced, it is difficult to allow the structure to have a strength capable of maintaining itself; therefore, such a content is not preferred. When the content is more than 50% by mass, metallic silicon exists in an amount more than necessary for appropriately bonding silicon carbide particles to each other, the resulting silicon carbide-based porous material contracts excessively during sintering, problems such as reduced porosity, reduced pore diameter and the like may appear; therefore, such a content is not preferred.

Meanwhile, the honeycomb structure of the present invention is characterized by being constituted by the above-mentioned silicon carbide-based porous material of the present invention. Reflecting the properties of the silicon carbide-based porous material as a constituent material, the honeycomb structure is superior in oxidation resistance, acid resistance, resistance to reaction with particulate and thermal shock resistance. Further, being a porous structure, the honeycomb structure of the present invention can be used under high-SV conditions as a DPF for capturing and removing the particulates discharged from a diesel engine, a catalyst carrier, etc.

Next, description is made on the process for producing the silicon carbide-based porous material of the present invention. In producing the silicon carbide-based porous material of the present invention, first, metallic silicon and an organic binder are added to a material of silicon carbide particles and they are mixed to obtain a mixed powder. Or, in producing the porous material as a honeycomb structure, metallic silicon and an organic binder are added to a material of silicon carbide particles and they are mixed and kneaded to obtain a puddle. Incidentally, materials for silicon carbide particles and metallic silicon may contain a small amount of impurities such as Fe, Al and the like; however, they may be used as they are or after being subjected to a chemical treatment such as chemical cleaning or the like, for purification. When the honeycomb structure is used as a filter, a pore-former may be added during preparation of puddle, in order to obtain a higher porosity.

The above mixed powder or puddle is molded into a desired shape such as honeycomb shape or the like; the molded material obtained is calcinated for removal (debinding) of the organic binder contained therein; then, the calcinated material is fired in a reduced pressure atmosphere of inert gas to produce a silicon carbide-based porous material having a desired shape. That is, in the present invention, since firing is conducted in a reduced pressure atmosphere, there can be obtained a silicon carbide porous material such as shown in FIG. 1, wherein the oxide film (e.g. $SiO_2$) which had been on the surfaces of silicon carbide particles 1 and metallic silicon, have vaporized and disappeared.

Since the oxide film reduces the wettability between silicon carbide particles and metallic silicon, the vaporization and disappearance thereof can increase the contact area between silicon carbide particles and metallic silicon. As a result, a silicon carbide-based porous material improved in strength and thermal conductivity can be produced.

The above-mentioned reduced pressure atmosphere may be an atmosphere having such a reduced pressure as to enable the vaporization and disappearance of oxide film (e.g. $SiO_2$) when firing is conducted. Specifically, 0.1 to 10 hPa is preferred and 0.5 to 5 hPa is more preferred. A reduced pressure of below 0.1 hPa is difficult to achieve in view of the cost for the equipment, and a reduced pressure of more than 10 hPa is not preferred because the vaporization of oxide film is insufficient. There is no particular restriction as to the kind of the inert gas needed to prepare a non-oxidizing atmosphere; however, use of Ar is preferred from the standpoint of availability, easy handleability, etc.

Next, description is made on other embodiment of the process for producing the silicon carbide-based porous material of the present invention. That is, the above-mentioned mixed powder or puddle is molded into a desired shape such as honeycomb shape or the like; the molded material obtained is calcinated for removal (debinding) of the organic binder contained therein; then, the calcinated material is fired in a hydrogen-containing reducing atmosphere to produce a silicon carbide-based porous material having a desired shape.

Figure 3:
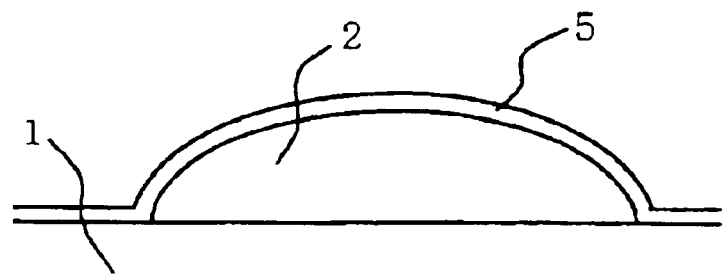
FIG. 3 is a schematic drawing explaining still other example of the contact state between silicon carbide particles and metallic silicon in the fine structure of the silicon carbide-based porous material of the present invention.

FIG. 3 is a schematic drawing explaining still other example of the contact state between silicon carbide particles and metallic silicon in the fine structure of the silicon carbide-based porous material of the present invention. The oxide film (e.g. $SiO_2$) on the surfaces of silicon carbide particles 1 and metallic silicon 2 is reduced and removed; that is, $SiO_2$ is reduced into Si and converted into new metallic silicon (reduced metallic silicon 5). As a result, the wettability between silicon carbide particles 1 and metallic silicon 2 is improved, the contact area between silicon carbide particles 1 and metallic silicon 2 is increased; and a silicon carbide-based porous material improved in strength and thermal conductivity can be produced.

In the present invention, there is no particular restriction as to the hydrogen content during firing; however, it may be such a hydrogen content as to enable the reduction and removal of oxide film (e.g. $SiO_2$) by firing. Specifically, 0.5 to 10% by volume is preferred and 1 to 4% by volume is more preferred. When the hydrogen content is below 0.5% by volume, the reductive removal of oxide film is insufficient; when the hydrogen content is more than 10% by volume, the handling of hydrogen gas is difficult; therefore, such hydrogen contents are not preferred.

Description is also made on still other embodiment of the process for producing the silicon carbide-based porous material of the present invention. That is, to a material of silicon carbide particles are added metallic silicon, an organic binder, and a metal element or a compound containing the metal element; they are mixed to obtain a mixed powder. This mixed powder or puddle is molded into a desired shape such as honeycomb shape or the like; the molded material obtained is calcinated for removal (debinding) of the organic binder contained therein; and the calcinated material is fired in a non-oxidizing atmosphere to produce a silicon carbide-based porous material of desired shape.

That is, according to the present invention, since a metal element or a compound containing the metal element is added to materials such as silicon carbide particles and the like, the composition and state of oxide film are changed. Therefore, as shown in FIG. 3, the surfaces of silicon carbide particles 1 and metallic silicon 2 are covered with a silicate compound phase 4; resultantly, the wettability between silicon carbide particles 1 and metallic silicon 2 is improved;

and a silicon carbide-based porous material improved in strength and thermal conductivity can be produced.

Now, there is explained the effect obtained when, in the present invention, a metal element or a compound containing the metal element is added to materials such as silicon carbide particles and the like. The oxide film on silicon carbide particles, etc. moves, during firing, from the interface between silicon carbide particles and metallic silicon to respective surfaces. At this time, the oxide film, i.e. $SiO_2$ reacts with the metal element to form a compound of MO—($M_1O$—, $M_2O$—, ...) $SiO_2$ system (M, $M_1$, $M_2$, ... refer to at least one kind of metal element) and is fixed in a crystalline or vitreous (amorphous) state which is a phase different from $SiO_2$.

Incidentally, the metal element preferably shows an eutectic point toward $SiO_2$, of 1,200 to 1,600° C., more preferably of 1,300 to 1,550° C., particularly preferably of 1,350 to 1,500° C. When the eutectic point is below 1,200° C., the melt of MO—($M_1O$—, $M_2O$—, ...)$SiO_2$ system does not remain at about the firing temperature at which metallic silicon melts, and the above-mentioned wettability improvement and contact area enlargement are hardly obtained during firing; therefore, such an eutectic point is not preferred. Meanwhile, when the eutectic point is more than 1,600° C., the reaction between MO ($M_1O$, $M_2O$, ...) and $SiO_2$ does not proceed sufficiently during firing and the above-mentioned wettability improvement and contact area enlargement are hardly obtained; therefore, such an eutectic point is not preferred.

There is no particular restriction as to the form of the metal element on the compound containing the metal element, and the form may be a powder or a solution. As the metal element, an alkaline earth metal element is used preferably and, as the alkaline earth metal element, calcium and/or strontium is used particularly preferably in order to obtain improved wettability and an enlarged contact area. Calcium and/or strontium is preferred also for handleability and good availability.

As the metal element-containing compound, there can be used a fluoride, carbide, chloride, silicide, carbonate, hydroxide, oxide, inorganic acid salt or organic acid salt of a metal element, or a mixture thereof. As the inorganic acid salt, there is preferably used a silicate, specifically cordierite (Mg—Al silicate) or anorthite (Ca—Al silicate). These compounds are preferred because they are inexpensive and easily available and can give a silicon carbide-based porous material which is high in porosity and strength and can be controlled as desired in thermal properties including thermal conductivity. Needless to say, there are preferred those silicates which are stable in the air and generate no toxic gas or the like during firing. A carbonate, an oxide and a hydroxide are preferred as well.

In the process for producing the silicon carbide-based porous material of the present invention, calcination is carried out preferably at a temperature lower than the melting point of metallic silicon. Specifically, the calcination may be conducted by once keeping the material to be calcinated at a predetermined temperature of about 150 to 700° C., or by using a small temperature elevation rate of 50° C./h or less in a given temperature range. In the calcination by once keeping the material to be calcinated at a predetermined temperature, keeping only at one temperature level or at a plurality of temperature levels is possible depending upon the kind and amount of the organic binder used; when keeping is made at a plurality of temperature levels, the time lengths of keeping may be the same or different. Similarly, in the calcination by using a small temperature elevation rate, the small temperature elevation rate may be used only in one temperature range or in a plurality of temperature ranges; when the small temperature elevation rate is used in a plurality of temperature ranges, the temperature elevation rates may be the same or different.

In order to obtain a texture in which refractory particles are bonded by metallic silicon, metallic silicon need be softened. Since the melting point of metallic silicon is 1,410° C., firing is conducted preferably at 1,410° C. or more in order to obtain a texture bonded by metallic silicon alone; in order to obtain a texture bonded also by a silicate compound phase, firing is conducted preferably at 1,300° C. or more. The optimum firing temperature is determined also from the fine structure and properties of the texture formed. However, at a firing temperature higher than 1,600° C., vaporization of metallic silicon proceeds and bonding via metallic silicon is difficult; therefore, the firing temperature is appropriately 1,300 to 1,600° C., preferably 1,350 to 1,550° C.

Incidentally, in the above-mentioned production process using recrystallization, disclosed in JP-A-6-182228, bonding between silicon carbide particles takes place and resultantly a sintered material of high thermal conductivity is obtained. However, as described previously, since sintering is conducted by a mechanism of vaporization and condensation, there is needed, for vaporization of silicon carbide, a firing temperature higher than required in production of the honeycomb structure of the present invention and, in order to obtain a silicon carbide-based porous material of practical applicability, firing need be conducted at a high temperature of at least 1,800° C. or more, ordinarily 2,000° C. or more.

The present invention is described below in more detail by way of Examples. However, the present invention is in no way restricted to these Examples.

EXAMPLE 1

A SiC raw material powder having an average particle diameter of 32.6 μm and a Si powder having an average particle diameter of 4 μm were compounded so as to give a composition of 80:20 by mass ratio. To 100 parts by mass of the resulting powder were added 6 parts by mass of methyl cellulose as an organic binder, 2.5 parts by mass of a surfactant and 24 parts by mass of water, and they were mixed and kneaded uniformly to obtain a puddle. The puddle was molded, by an extruder, into a honeycomb shape having an outer diameter of 45 mm, a length of 120 mm, a partition wall thickness of 0.43 mm and a cell density of 100 cells/in.$^2$ (16 cells/cm$^2$).

Figure 5:
FIG. 5 is a micrograph showing the fine structure of the silicon carbide-based porous material produced in Example 1.

The honeycomb molded material was calcinated for debinding, in a low-oxygen atmosphere at 550° C. for 3 hours and then fired in a 2 hPa-Ar atmosphere at 1,450° C. for 2 hours to obtain a silicon carbide-based porous material of honeycomb structure. In FIG. 5 is shown a microgram of the fine structure of the silicon carbide-based porous material. Incidentally, in FIG. 5, the gray portions are silicon carbide particles, the white portions are metallic silicon, and the black portions are pores. The same applies to the micrograms mentioned below.

EXAMPLE 2

Figure 6:
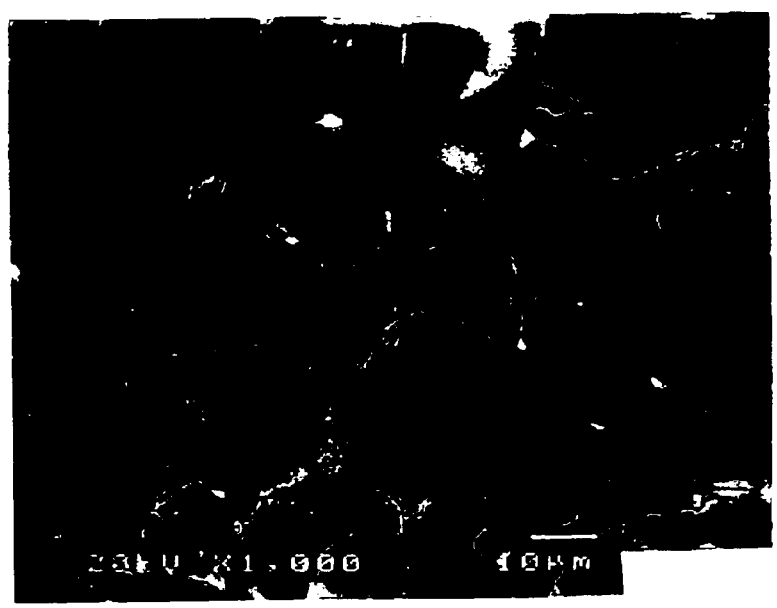
FIG. 6 is a micrograph showing the fine structure of the silicon carbide-based porous material produced in Example 2.

The operation up to calcination was conducted in the same manner as in Example 1. The calcinated material obtained was fired in an Argon atmosphere containing 4% of hydrogen, at 1,450° C. for 2 hours to obtain a silicon carbide-based porous material of honeycomb structure. In FIG. 6 is shown a microgram of the fine structure of the silicon carbide-based porous material.

EXAMPLE 3

A SiC raw material powder having an average particle diameter of 32.6 µm and a Si powder having an average particle diameter of 4 µm were compounded so as to give a composition of 80:20 by mass ratio. To 100 parts by mass of the resulting powder was added 1% by mass (0.4% by mass in terms of calcium) of calcium carbonate, and they were mixed. To 100 parts by mass of the resulting powder were added 6 parts by mass of methyl cellulose as an organic binder, 2.5 parts by mass of a surfactant and 24 parts by mass of water, and they were mixed and kneaded uniformly to obtain a puddle. The puddle was molded, by an extruder, into a honeycomb shape having an outer diameter of 45 mm, a length of 120 mm, a partition wall thickness of 0.43 mm and a cell density of 100 cells/in.$^2$ (16 cells/cm$^2$).

Figure 7:
FIG. 7 is a micrograph showing the fine structure of the silicon carbide-based porous material produced in Example 3.

The honeycomb molded material was calcinated for debinding, in a low-oxygen atmosphere at 550° C. for 3 hours and then fired in an Ar atmosphere at 1,450° C. for 2 hours to obtain a silicon carbide-based porous material of honeycomb structure. In FIG. 7 is shown a microgram of the fine structure of the silicon carbide-based porous material.

EXAMPLE 4

A silicon carbide-based porous material of honeycomb structure was produced in the same manner as in Example 3 except that addition of 1% by mass (0.4% by mass in terms of calcium) of calcium carbonate was replaced by addition of 1% by mass (0.6% by mass in terms of strontium) of strontium carbonate.

EXAMPLE 5

A silicon carbide-based porous material of honeycomb structure was produced in the same manner as in Example 3 except that compounding of a SiC raw material powder and a Si powder so as to give a composition of 80:20 by mass ratio was replaced by compounding of a SiC raw material powder, a Si powder and a cordierite (Mg—Al silicate) powder so as to give a composition of 80:10:10 by mass ratio.

COMPARATIVE EXAMPLE 1

Figure 8:
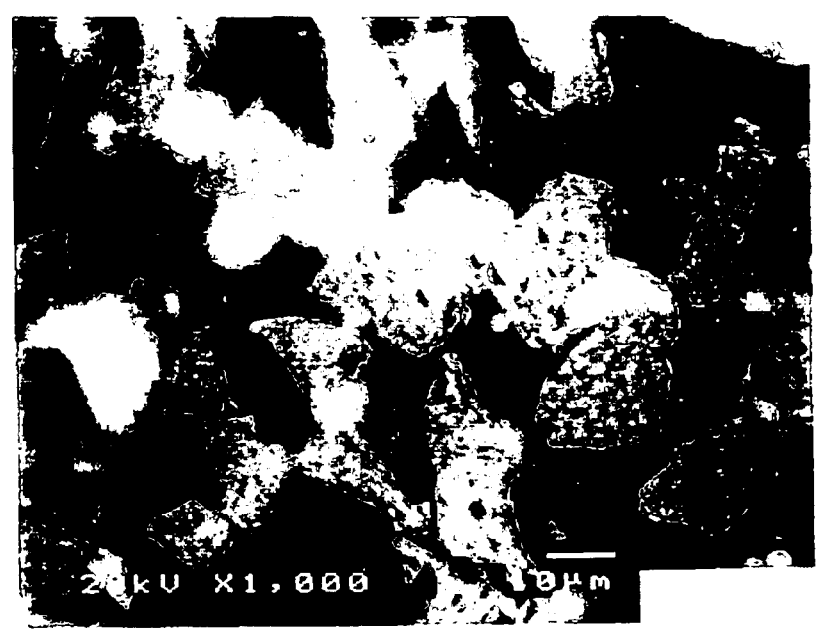
FIG. 8 is a micrograph showing the fine structure of the silicon carbide-based porous material produced in Comparative Example 1.

The operation up to calcination was conducted in the same manner as in Example 1. The calcinated material obtained was fired in an Argon atmosphere of normal pressure, at 1,450° C. for 2 hours to obtain a silicon carbide-based porous material of honeycomb structure. In FIG. 8 is shown a microgram of the fine structure of the silicon carbide-based porous material.

(Tests for Physical Properties)

Each of the silicon carbide-based porous materials obtained in Examples 1 to 3 and Comparative Example 1 was measured for average pore diameter by mercury porosimetry, as well as for porosity by the Archimedes method. Specified test pieces were cut out from each porous material and tested for strength at room temperature by a three-point bending test using a material tester, as well as for thermal conductivity by a laser flash method. The results are shown in Table 1.

TABLE 1

| | Average pore diameter (µm) | Porosity (%) | Strength (MPa) | Thermal conductivity (W/mK) |
|---|---|---|---|---|
| Example 1 | 15 | 53 | 13 | 21 |
| Example 2 | 15 | 51 | 19 | 17 |
| Example 3 | 14 | 50 | 23 | 16 |
| Example 4 | 13 | 49 | 27 | 16 |
| Example 5 | 15 | 48 | 34 | 8 |
| Comparative Example 1 | 7 | 42 | 11 | 14 |

As shown in Table 1, the silicon carbide-based porous materials of Examples 1 to 5, as compared with the silicon carbide-based porous material of Comparative Example 1, are large in average pore diameter and high in porosity. Further, the silicon carbide-based porous materials of Examples 1 to 4, as compared with the silicon carbide-based porous material of Comparative Example 1, are high in strength and thermal conductivity and accordingly superior in thermal shock resistance, and the superior effects of the present invention could be confirmed.

Meanwhile, it is clear that the silicon carbide-based porous material of Example 5 has about the same average pore diameter, porosity and strength as the silicon carbide-based porous materials of Examples 1 to 4 do, but is low in thermal conductivity. That is, it is considered that the silicon carbide-based porous material of Example 5 has a reduced thermal conductivity because it contains cordierite which is a Mg—Al silicate. Thus, it became clear that by controlling the materials used and their compositions, the resulting silicon carbide-based porous material can have pore properties (e.g. average particle diameter and porosity), mechanical properties (e.g. strength) and thermal properties (e.g. thermal conductivity) appropriately controlled so as to meet the application.

Further, the silicon carbide-based porous materials of Examples 1 to 3, as shown in FIGS. 5 to 7, each show an acute contact angle between silicon carbide particles and metallic silicon and has a large contact area. Furthermore, pores are formed by the gaps between domains, and pores of large diameter could be confirmed as compared with a case such as shown in FIG. 8, in which the contact angle between silicon carbide particles and metallic silicon is obtuse.

INDUSTRIAL APPLICABILITY

As described above, the silicon carbide-based porous material and honeycomb structure of the present invention contain refractory particles such as silicon carbide particles and yet can be sintered, in production thereof, at a relatively low firing temperature; therefore, they can be provided at a low production cost, at a high yield and at a low product cost. Further, the silicon carbide-based porous material has a desired fine structure and accordingly properties such as high porosity, high thermal conductivity and high strength; when it is used, for example, as a DPF and when the particulates deposited thereon are burnt for filter regeneration, there is no such local heat generation as to damage the filter; and, being a porous honeycomb structure, it can be suitably used, even under high SV conditions, as a filter for purification of automobile exhaust gas, a catalyst carrier, etc.

Moreover, according to the process for producing the silicon carbide-based porous material of the present invention, there can be produced a silicon carbide-based porous material high in porosity and thermal conductivity and improved in strength, inexpensively under the given steps and conditions.

What is claimed is:

1. A silicon carbide-based porous material containing silicon carbide particles as an aggregate and metallic silicon, characterized in that the average pore diameter of the silicon carbide-based porous material is at least 0.25 time the average particle diameter of the silicon carbide particles; and which contains an amorphous or crystalline silicate compound phase on or in the vicinity of the silicon carbide particles and/or the metallic silicon; and wherein the silicate compound phase contains at least one kind of metal element other than silicon and silicon dioxide and the content of the at least one kind of metal element to the total of the silicon carbide particles and the metallic silicon is 0.1 to 10% by mass.

2. A silicon carbide-based porous material according to claim 1, wherein the contact angle between the silicon carbide particles and the metallic silicon is acute.

3. A silicon carbide-based porous material according to claim 1, wherein a large number of secondary texture particles each formed by contact of at least four silicon carbide particles with one metallic silicon are bonded to each other to form a porous structure.

4. A silicon carbide-based porous material according to claim 3, wherein the number of the silicon carbide particles contained in one secondary texture particle is 30% or more of the number of the silicon carbide particles contained in the silicon carbide-based porous material.

5. A silicon carbide-based porous material according to claim 1, wherein the area of the interface between the silicon carbide particles and the metallic silicon is 50% or more of the total area of the interface area and the surface area of the metallic silicon.

6. A silicon carbide-based porous material according to claim 1, wherein the silicon carbide particles are bonded to each other by the metallic silicon and/or the silicate compound phase.

7. A silicon carbide-based porous material according to claim 1, wherein the silicate compound phase contains at least one kind of metal element other than silicon and silicon dioxide and the eutectic point between the at least one kind of metal element and the silicon dioxide is 1,200 to 1,600° C.

8. A silicon carbide-based porous material according to claim 7, wherein at least one kind of the at least one kind of metal element is an alkaline earth metal element.

9. A silicon carbide-based porous material according to claim 8, wherein the at least one kind of metal element further contains a metal element other than the alkaline earth metal element.

10. A silicon carbide-based porous material according to claim 8, wherein the alkaline earth metal element is calcium and/or strontium.

11. A silicon carbide-based porous material according to claim 1, wherein the content of the metallic silicon to the total of the silicon carbide particles and the metallic silicon is 5 to 50% by mass.

12. A honeycomb structure, characterized in that said honeycomb structure is constituted by a silicon carbide-based porous material containing silicon carbide particles as an aggregate and metallic silicon, wherein the average pore diameter of the silicon carbide-based porous material is at least 0.25 time the average particle diameter of the silicon carbide particles; and which contains an amorphous or crystalline silicate compound phase on or in the vicinity of the silicon carbide particles and/or the metallic silicon; and wherein the silicate compound phase contains at least one kind of metal element other than silicon and silicon dioxide and the content of the at least one kind of metal element to the total of the silicon carbide particles and the metallic silicon is 0.1 to 10% by mass.

13. A honeycomb structure according to claim 12, wherein the contact angle between the silicon carbide particles and the metallic silicon is acute.

14. A honeycomb structure according to claim 12, wherein a large number of secondary texture particles each formed by contact of at least four silicon carbide particles with one metallic silicon are bonded to each other to form a porous structure.

* * * * *